(No Model.)
W. A. STODDARD.
STUMP EXTRACTOR.
No. 247,705. Patented Sept. 27, 1881.
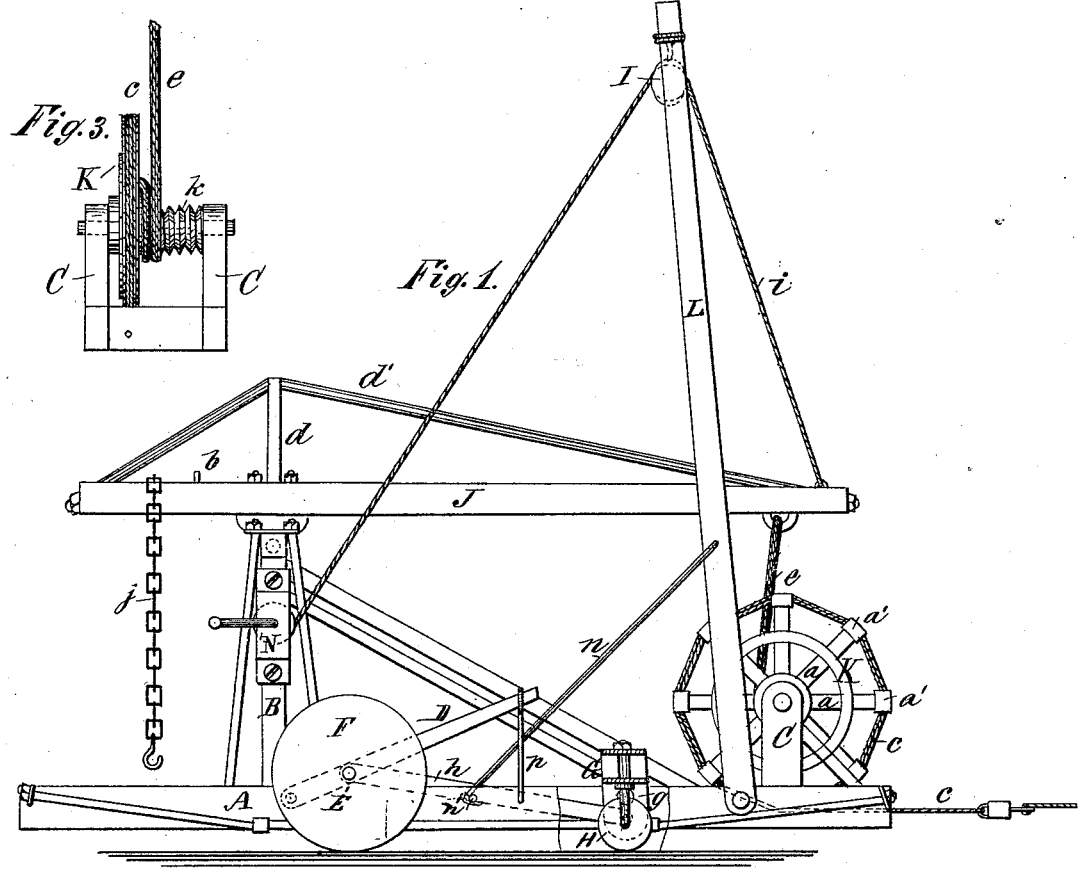
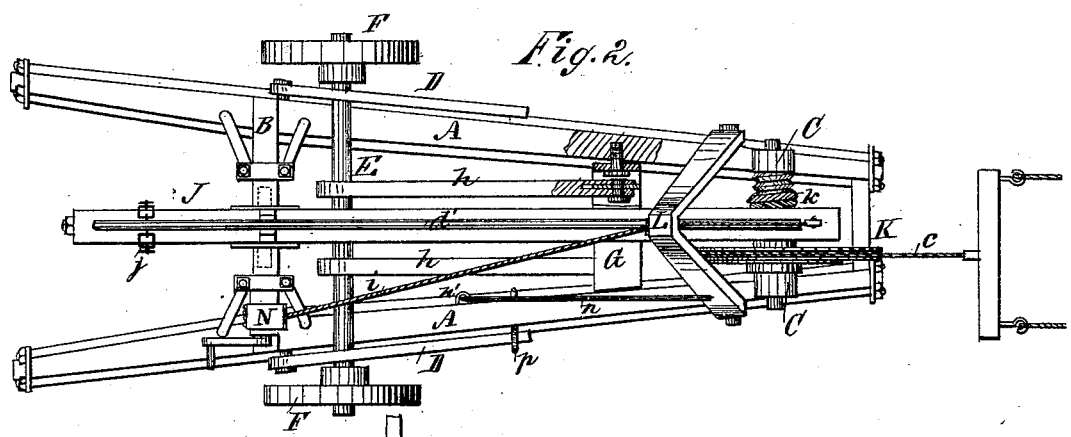
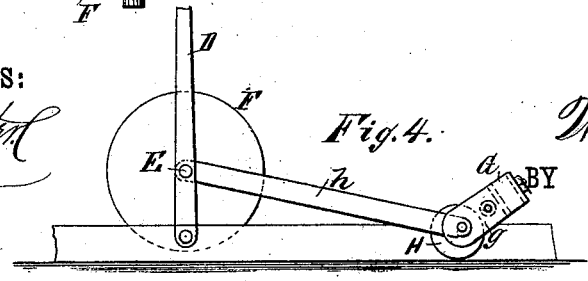
WITNESSES: INVENTOR:
W. A. Stoddard
BY
ATTORNEYS.
N. PETERS, Photo-Lithographer, Washington, D. C.

United States Patent Office.

WILLIAM A. STODDARD, OF DALLAS, OREGON.

STUMP-EXTRACTOR.

SPECIFICATION forming part of Letters Patent No. 247,705, dated September 27, 1881.

Application filed July 18, 1881. (No model.)

*To all whom it may concern:*

Be it known that I, WILLIAM A. STODDARD, of Dallas, in the county of Polk and State of Oregon, have invented a new and useful Improvement in Grub and Stump Pulling Machines, of which the following is a specification.

The object of my invention is to provide a grub and stump pulling machine which shall give great power in small space, and one which can be easily handled and moved.

The invention consists in providing the frame of the machine with trucks, which are simultaneously operated by hand-levers, for easily and quickly mounting the machine for moving and for lowering the machine upon the ground when the grub or stump or other object is to be raised; in providing a power-lever and power-wheel and axle supported at opposite ends of the frame in suitable posts and bearings, the wheel being constructed to have the draw-rope reeled upon it; in the parts last-mentioned, in combination with a crane and an elevated pulley and a reel and cord for raising the long arm of the power-lever after the same shall have been lowered by the wheel and axle for raising the load; and also in the details of construction of the frame, and of the combination and arrangement of parts, as hereinafter fully described and claimed.

In the accompanying drawings, Figure 1 is side elevation, partly in section, of my improved grub and stump pulling machine. Fig. 2 is a plan view, also partly in section. Figs. 3 and 4 are details, showing respectively the power-wheel and axle and the connected trucks and lever removed from the frame.

Similar letters of reference indicate corresponding parts.

The frame of the machine is composed of the diverging ground-sills A A, the forward upright posts, B B, and the rear posts, C C, all of which are of wood and suitably trussed and braced, as shown. Upon the outside of the sills A A, near the uprights B B, are pivoted the levers D D, and in these levers, a short distance from their pivoted end, the axle E of the forward wheels, F F, takes its bearings. Between the sills A A, and near the rear ends thereof, is pivoted the frame or head G, in which is swiveled the rear truck or ground wheel, H. This frame or pivoted head G has depending from it upon both sides of the swiveled wheel the arms $g$ $g$, to the lower ends of which the rear ends of the connecting-rods $h$ $h$ are attached. The forward ends of these connecting-rods are attached to near the center of the axle E, and they are of such length relative to the distance of movement of the axle when raised or lowered by the levers D D that when the axle is lowered to the position shown in Fig. 1 to lift the forward end of the frame from the ground the pivoted frame G will be moved to a vertical position, as shown in this figure, and will thus at the same time raise the rear end of the frame, in which position the machine is ready to be moved bodily or swung around upon the swiveled wheel. When the axle is brought to the position shown in Fig. 4 the wheel H, as well as the wheels F F, will be raised from the ground and the frame lowered upon ground, in which position the machine is ready for lifting the load by means of the chain $j$, power-lever J, and the power-wheel K and the axle $k$.

The power-lever is fulcrumed upon the strong upright posts B B, and is trussed from end to end and over the stud $d$ by the truss-rod $d'$. The wheel and axle K $k$ are journaled in the upright posts C C. The axle is spirally grooved, as shown, to prevent chafing of the rope $e$ as it is wound upon the axle for lowering the long arm of the lever. The ends of the spokes $a$ of the power-wheel K are provided with the metal clips $a'$, which are guttered out so that the draw-rope $e$ (to which the horse or other power is attached) may be reeled upon the power-wheel, as shown.

To the outside of the sills A A, and a little in front of the posts C C, is pivoted the crane L, which rises above the long arm of the main lever and supports the pulley-block I, over which the rope $i$ passes. One end of the rope is attached to the rear end of the power-lever, while the other end of it passes around crank-reel N, secured to the side of one of the upright posts B. The purpose of this reel and rope is to elevate the rear end of the main lever after the load has been raised and detached.

The crane is braced by the hooked rod $n$, which enters the staple $n'$ on the inside of the sill A. By means of this rod the crane may be lowered when the machine is not in use.

The levers D D may be held so as to keep the trucks and the swiveled wheel in contact with the ground and the machine elevated by means of the looped tie-rod p, hinged to the sill A, which rod is adapted to be placed over the end of the lever, as shown in Fig. 1.

The short arm of the main lever may have a series of pins, as shown at b, over which the chain j may be placed for regulating the power and the distance of elevation of the load, as desired.

It will be understood that the power-wheel may be very large, and that by this means the power of the machine may be greatly multiplied without rendering the machine any the more cumbersome or difficult to move or put in position for attachment to the grub, stump, or other object to be raised.

Having thus fully described my invention, I claim as new and desire to secure by Letters Patent—

1. In a grub and stump pulling machine, the axle E, journaled in the pivoted levers D D, in combination with the pivoted frame or head G, wheel H, and connecting-rods h h, substantially as and for the purposes set forth.

2. The hinged frame or head G, provided with the swiveled wheel H, in combination with the movable or swinging axle E, as and for the purposes set forth.

3. In a grub and stump pulling machine, the main power-lever J, in combination with the wheel and axle K k, the wheel being adapted to have the draw-cord reeled upon it, as and for the purposes set forth.

4. In a grub and stump pulling machine, the main power-lever J and the power-wheel and axle K k, in combination with the crane L and crank-reel N, for raising the long arm of the main lever by means of the rope i, substantially as and for the purposes set forth.

5. The grub and stump pulling machine herein shown and described, consisting of the frame composed of the sills A A, uprights B B, and posts C C, in combination with the swing-axle E, swiveled wheel H, secured in the pivoted frame G, the lever J, wheel and axle K k, and crane L, substantially as and for the purposes set forth.

WILLIAM ALBERT STODDARD.

Witnesses:
W. S. FRINK,
J. D. LEE.